United States Patent
Mizuno

(10) Patent No.: US 11,364,432 B2
(45) Date of Patent: Jun. 21, 2022

(54) TIMING GAME DEVICE AND PROGRAM FOR TIMING GAME

(71) Applicant: Alpha Code Inc., Tokyo (JP)

(72) Inventor: Takuhiro Mizuno, Tokyo (JP)

(73) Assignee: Alpha Code Inc., Tokyo (JP)

( * ) Notice: Subject to any disclaimer, the term of this patent is extended or adjusted under 35 U.S.C. 154(b) by 0 days.

(21) Appl. No.: 17/257,491

(22) PCT Filed: May 16, 2019

(86) PCT No.: PCT/JP2019/019461
§ 371 (c)(1),
(2) Date: Dec. 31, 2020

(87) PCT Pub. No.: WO2020/017138
PCT Pub. Date: Jan. 23, 2020

(65) Prior Publication Data
US 2021/0220728 A1 Jul. 22, 2021

(30) Foreign Application Priority Data
Jul. 17, 2018 (JP) .............................. JP2018-134444

(51) Int. Cl.
*A63F 13/212* (2014.01)
*A63F 13/44* (2014.01)
(Continued)

(52) U.S. Cl.
CPC ............ *A63F 13/212* (2014.09); *A63F 13/25* (2014.09); *A63F 13/44* (2014.09);
(Continued)

(58) Field of Classification Search
CPC ........ A63F 13/212; A63F 13/44; A63F 13/53; A63F 13/55; A63F 2300/8082
See application file for complete search history.

(56) References Cited

U.S. PATENT DOCUMENTS 6,429,863 B1 * 8/2002 LoPiccolo ............... A63F 13/10
345/419
6,482,087 B1 * 11/2002 Egozy ..................... A63F 13/12
463/7

(Continued)

FOREIGN PATENT DOCUMENTS

JP 2010-219849 A 9/2010
JP 2015-231443 A 12/2015
(Continued)

OTHER PUBLICATIONS

Frequency (video game). Wikipedia.org. Online. Accessed via the Internet. Accessed May 20, 2021. <URL: https://en.wikipedia.org/wiki/Frequency_(video_game)> (Year: 2001).*
(Continued)

*Primary Examiner* — Thomas J Hong
*Assistant Examiner* — Carl V Larsen
(74) *Attorney, Agent, or Firm* — Polsinelli PC

(57) ABSTRACT

A timing game device includes a virtual-space image display unit 13, a movement-line display unit 14, and an object display unit 15. The virtual-space image display unit 13 generates a virtual space image, based on VR image data in which a hit area is set in a virtual space having a range wider than a view field of the HMD 200 and displays the virtual space image on a HMD 200. The virtual space image has a view field that changes in response to a movement of the HMD 200. The movement-line display unit 14 generates and displays a movement line of an object that moves to a hit area. The object display unit 15 displays the object to move along the movement line. A game is caused to progress by performing an operation at a timing at which the object reaches the hit area set in the virtual space of the changed view field while appropriately changing the view field of the (Continued)

virtual space image in response to the movement of the HMD 200.

9 Claims, 6 Drawing Sheets

(51) Int. Cl.
  *A63F 13/53* (2014.01)
  *A63F 13/55* (2014.01)
  *A63F 13/25* (2014.01)
  *A63F 13/5255* (2014.01)

(52) U.S. Cl.
  CPC .......... *A63F 13/5255* (2014.09); *A63F 13/53* (2014.09); *A63F 13/55* (2014.09); *A63F 2300/8082* (2013.01)

(56) References Cited

U.S. PATENT DOCUMENTS

| | | | |
|---|---|---|---|
| 10,427,044 | B2 | 10/2019 | Katagai |
| 10,504,296 | B2 | 12/2019 | Noguchi |
| 10,596,464 | B2 | 3/2020 | Doucet et al. |
| 10,780,356 | B2 * | 9/2020 | Jeon ................ A63F 13/54 |
| 2008/0200224 | A1 * | 8/2008 | Parks ................ A63F 13/814 463/7 |
| 2013/0157761 | A1 * | 6/2013 | Cichowlas ............ A63F 13/42 463/31 |
| 2018/0008893 | A1 | 1/2018 | Katagai |
| 2018/0028915 | A1 | 2/2018 | Doucet et al. |
| 2018/0078857 | A1 * | 3/2018 | Kim ................ G06F 3/04847 |
| 2018/0151001 | A1 * | 5/2018 | Noguchi ............... H04S 7/303 |
| 2020/0171385 | A1 | 6/2020 | Doucet et al. |

FOREIGN PATENT DOCUMENTS

| | | |
|---|---|---|
| JP | 2016-193053 A | 11/2016 |
| JP | 2016-214822 A | 12/2016 |
| JP | 2017-184982 A | 10/2017 |
| JP | 2018-088946 A | 6/2018 |
| WO | WO 2008/052254 A1 | 5/2008 |

OTHER PUBLICATIONS

Frequency. Game Manual. Online. 2001. Accessed via the Internet. Accessed May 20, 2021. <URL: http://www.replacementdocs.com/download.php?view.1160> (Year: 2001).*

Testgame2012. PS2 Frequency Science Genius Girl—Freezepop. Online. Jan. 19, 2012. Accessed via the Internet. Accessed May 20, 2021 <URL: https://www.youtube.com/watch?v=GG6o0jQLuGE> (Year: 2012).*

GAME Watch, Review of VR rhythm game "Beat Saber"; Jun. 6, 2018; https://game.watch.impress.co.jp/docs/review/1125974.html.

China Arrowiz , VR rhythm game "Beats Fever" is Japan all were also included study the release of the region, Social VR Info, [Online], Mar. 30, 2017, Jul. 3, 2019 search, Internet: URL: https://svnnfo.ip/detail?p=181434.

VR rhythm action "Airtone" is "VR sound game" feel the possibility of dextrose [Tokyo Lee emissions Dee festival], Famitsu App, [Online], May 13, 2017, Jul. 3, 2019 search, Internet: URL: https://app.famitstu.com/20170513_1044473/.

Big movement turns into attack power! Enjoy fitness while playing games "VR Fitness" is Steam delivered in-sales start, VR Inside, [Online], Aug. 8, 2017, Jul. 3, 2019 search, Internet: URL: https://vrinside.jp/news/indeacloud-vrfitness/.

Sato, Kazuya, VR Zone new "Dragon Quest VR" experience—demon senses and magic kill the method pleasure shoot the CNET Japan, [Online], Apr. 26, 2018, Jul. 3, 2019 search, Internet: URL: https://japan.cnet.com/article/35118364/.

* cited by examiner

TIMING GAME DEVICE AND PROGRAM FOR TIMING GAME

CROSS REFERENCE TO RELATED APPLICATIONS

This application is a National Phase filing under 35 U.S.C. § 371 of PCT/JP2019/019461 filed on 16 May 2019; which application in turn claims priority to Application No. 2018-134444 filed in Japan on 17 Jul. 2018. The entire contents of each application are hereby incorporated by reference.

TECHNICAL FIELD

The present invention relates to a timing game device and a program for a timing game, and is particularly suitable for use in a timing game in which a user performs a predetermined operation at a timing in accordance with the movement of a moving object.

BACKGROUND ART

Conventionally, a timing game that takes a timing in accordance with a rhythm, music, the movement of an image, or the like has been provided. In the timing game, a reference line and an object that moves to the reference line are displayed on a display screen. Evaluation is performed based on whether or not a predetermined operation is performed at a timing at which the object reaches the reference line, and the score is added (for example, see Patent Document 1). In the game device disclosed in Patent Document 1, various productions are provided by changing a display position of the reference line and a movement direction of an object based on predetermined change conditions.

In addition, a timing game that utilizes a virtual reality (VR) technology, that has been gaining momentum in recent years, is also provided (for example, Non-Patent Document 1). In a VR rhythm game disclosed in Non-Patent Document 1, an user takes an action on an object that is coming from the front (back side in a space) to a virtual player side (front side of the space) in the three-dimensional virtual space, with a VR controller. Then, evaluation is performed based on whether or not an appropriate action is performed at a proper timing in accordance with the arrival position and the type of the object, and the score is added.

Patent Document 1: JP-A-2016-193053
Non-Patent Document 1: GAME Watch "VR Rhythm game "Beat Saber" Review" published on Jun. 6, 2018, https://game.watch.impress.co.jp/docs/review/1125974.html

SUMMARY OF THE INVENTION

Technical Problem

One of the attractions of the VR game is the experience that allows the user to move and directly interfere with virtual objects. The VR rhythm game disclosed in Non-Patent Document 1 also has contents that take such attractions. In addition, in the VR rhythm game disclosed in Non-Patent Document 1, an object (obstacle such as a wall or the ceiling) required to be avoided by the movement of the user him/herself is provided in addition to an object (score block) on which the user can appropriately take an action to obtain the score. Thus, the VR rhythm game is devised so that the production is not monotonous.

However, the VR rhythm game disclosed in Non-Patent Document 1 has a problem that the displayed virtual space is always fixed, and thus it is not possible to fully utilize the characteristics of VR. That is, the virtual player in the virtual space always stands at the same place, and directed in the same direction (forward; the object is coming from the forward side), and thus the user just repeats the same action. The relief of the monotony is achieved by mixing objects as obstacles in addition to the score blocks, but the action itself taken on the score block by the user is still monotonous.

The invention has been made in order to solve such a problem, and an object of the invention is to, in a timing game utilizing VR, utilize the characteristics of VR in that a view field of a virtual space image displayed on an HMD may change, diversify an action on an object that moves in a virtual space, and thus allow a user to enjoy a game more.

Solution to Problem

To solve the above problem, in the invention, a virtual space image having a view field that changes in response to a movement of a head mounted display is generated and displayed on the head mounted display, based on virtual-reality image data in which a plurality of hit areas are set at different positions in a virtual space having a range wider than a view field corresponding to a case where the head mounted display is not moved. In addition, a plurality of movement lines of objects that respectively move to the plurality of hit areas are generated and displayed in the virtual space image. Then, an operation is evaluated based on whether or not an operation on the object is received at a timing at which the object displayed to move along the movement line reaches the hit area.

Advantageous Effects of the Invention

According to the invention configured as described above, the plurality of hit areas are set at the different positions in the virtual space having the range wider than the view field corresponding to a case where the head mounted display is not moved. Thus, in some hit areas, in a case where the view field of the displayed virtual space image is not changed by moving the head mounted display, it is not possible for the user to perform an action. Therefore, the user progresses a game by performing an operation on the hit area at a timing at which the object reaches the hit area set in the virtual space of the changed view field while moving the head mounted display to appropriately change the view field of the virtual space image. Accordingly, it is possible to utilize the characteristics of VR that the view field of a virtual space image displayed on a head mounted display may be changed, and diversify an action on an object that moves in a virtual space. It is possible to cause a user to enjoy a game more.

MODE FOR CARRYING OUT THE INVENTION

Figure 1:
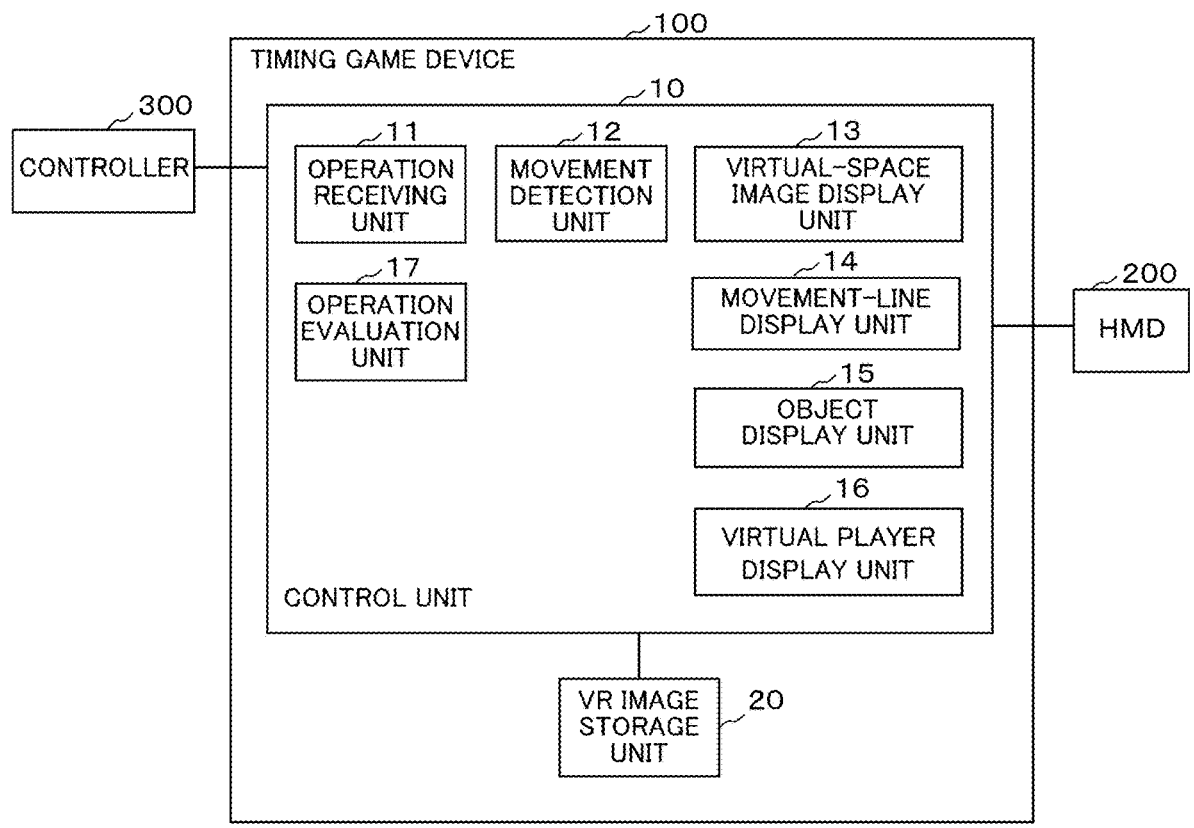
FIG. 1 is a block diagram illustrating an example of a functional configuration of a timing game device according to an embodiment.

Hereinafter, an embodiment of the invention will be described with reference to the drawings. FIG. 1 is a block diagram illustrating an example of a functional configuration of a timing game device 100 according to an embodiment. In the embodiment, the timing game device 100 is a device that provides a game operated in a manner that a three-dimensional virtual space image of VR and an object that moves in a virtual space are displayed on a HMD 200, an operation is evaluated based on whether or not a user can appropriately operate a controller 300 to perform an action on the object at a timing at which the object reaches in a hit area set in the virtual space, and a score is added based on an evaluation result.

The HMD 200 on which the virtual space image is displayed is equipped with a gyro sensor and an acceleration sensor, and can detect the movement of the head of the user wearing the HMD 200. The timing game device 100 controls the display of the virtual space image so that the view field of the virtual space image realized on the display of the HMD 200 changes dynamically in response to the movement of the head of the user, which is detected by the sensor of the HMD 200. Then, the object and a movement line (details will be described later) are displayed to be superimposed on the virtual space image, and whether or not an action on the object is performed at a timing at which the object that moves along the movement line reaches the hit area is evaluated.

In the embodiment, the timing game device 100 includes a control unit 10 and a VR image storage unit 20. The control unit 10 includes an operation receiving unit 11, a movement detection unit 12, a virtual-space image display unit 13, a movement-line display unit 14, an object display unit 15, a virtual player display unit 16, and an operation evaluation unit 17, as a functional configuration. The functional blocks 11 to 17 can be configured by any of hardware, a digital signal processor (DSP), and software. For example, in a case where the functional blocks are configured by software, each of the functional blocks 11 to 17 is configured to include a CPU, a RAM, a ROM, and the like of a computer in practice, and is realized by running a program for a timing game, which is stored in the RAM, the ROM, or a recording medium such as a hard disk or a semiconductor memory.

Figure 2:
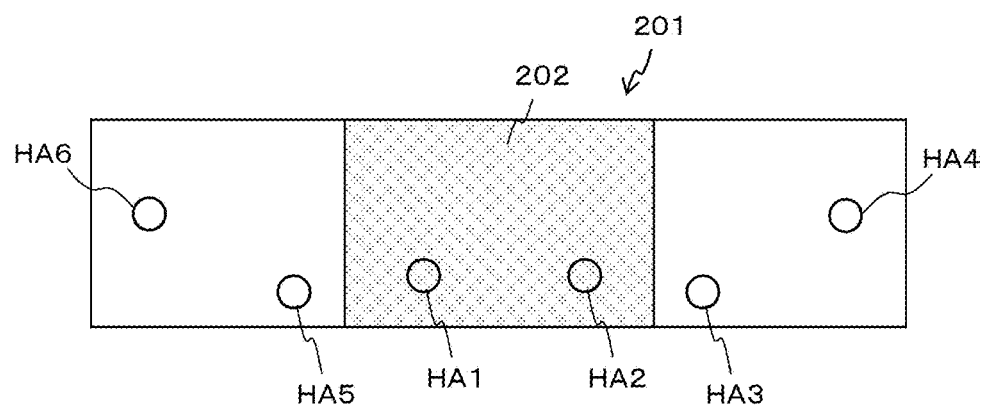
FIG. 2 is a schematic diagram illustrating a virtual space realized by VR image data, a view field corresponding to a virtual space image displayed on a HMD, and a plurality of hit areas set in a virtual space, in the embodiment.

The VR image storage unit 20 stores VR image data (virtual-reality image data in claims) for displaying a virtual space image, a movement line, an object, and a virtual player on the HMD 200. In the embodiment, in the VR image data, a plurality of hit areas are set at different positions in a virtual space having a range wider than a fixed view field corresponding to a case where the HMD 200 is not moved. FIG. 2 is a schematic diagram illustrating the virtual space realized by the VR image data, the view field corresponding to the virtual space image displayed on the HMD 200, and the plurality of hit areas set in the virtual space, in the embodiment.

In FIG. 2, an area indicated by the entire rectangular frame indicates the entire virtual space 201 realized by VR image data. In addition, a shaded area in the virtual space 201 indicates a view field 202 corresponding to a virtual space image displayed on the HMD 200. The view field 202 referred here means a partial virtual space having a range being displayed on a display screen of the HMD 200. That is, the view field 202 is obtained from the entire virtual space 201 by changing in response to the movement of the HMD 200.

Note that, in FIG. 2, for convenience of illustration, spreads of the three-dimensional virtual space 201 in a longitudinal direction and a transverse direction are illustrated in a plane (depth is not expressed). That is, FIG. 2 illustrates a state where the three-dimensional virtual space 201 is developed in a plane, and is viewed from the front. A longitudinal direction of the rectangular frame corresponds to the height of the virtual space 201 (the lower side of the rectangular frame is the lowest position, and the upper side is the highest position), and a transverse direction corresponds to the width of the virtual space 201.

In addition, in the example in FIG. 2, the size of the virtual space 201 in a vertical direction is equal to the size of the view field 202 in the vertical direction. That is, the size of the virtual space 201 in the vertical direction is equal to the size of the display screen of the HMD 200 in the longitudinal direction. Thus, the view field 202 can be changed only in a horizontal direction. Here, for simple description, an example in which the view field 202 is allowed to be changed only in the horizontal direction is described, but the view field 202 may be configured to be allowed to be also changed in the vertical direction.

In FIG. 2, six areas indicated by HA1 to HA6 are hit areas. As illustrated in FIG. 2, a plurality of hit areas HA1 to HA6 are set at different positions in the virtual space 201 having a range wider than the view field 202. The setting positions of the hit areas HA1 to HA6 are fixed. FIG. 2 illustrates a state where the view field 202 is provided substantially in the vicinity of the center of the virtual space 201 and the two hit areas HA1 and HA2 are included in the view field 202. When the view field 202 in the virtual space 201 is moved, the hit areas included in the view field 202 are also moved. Note that, in the conventional VR rhythm game disclosed in Non-Patent Document 1, the view field 202 is fixed and is not changed, and thus the hit areas HA1 and HA2 included in the view field 202 are also fixed and are not changed.

The operation receiving unit 11 receives an operation on the controller 300 by a user. The controller 300 is a controller for VR and is used by the user gripping the controller with a hand. The controller 300 is also equipped with a gyro sensor and an acceleration sensor, and can detect the movement of the hand of the user gripping the controller 300. The operation receiving unit 11 receives the movement of the hand of the user as an operation to the controller 300, based on information output from the sensor of the controller 300. Note that, the operation to the controller 300 is not limited to this. For example, the operation receiving unit 11 may receive an operation to a button provided on the controller 300.

The movement detection unit 12 detects the movement of the HMD 200 worn by the user. As described above, the HMD 200 is equipped with the gyro sensor and the acceleration sensor. The movement detection unit 12 detects whether or not the HMD 200 moves, and a direction and the amount of the movement when the HMD moves, based on information output from the sensor of the HMD 200.

The virtual-space image display unit 13 generates a virtual space image having a view field that changes in response to the movement of the HMD 200 detected by the movement detection unit 12 based on VR image data stored in the VR image storage unit 20, and displays the generated virtual space image on the HMD 200. That is, when the user faces the front in the virtual space 201 illustrated in FIG. 2, the virtual-space image display unit 13 generates a virtual space image in which the virtual space in the front (view field 202 set in the center of the virtual space 201 as illustrated in FIG. 2) is widened, and then displays the generated virtual space image on the HMD 200. In addition, when the user is directed from the front to the right by x degrees, the virtual-space image display unit 13 generates a virtual space image in which the virtual space having a range (view field) that is changed from the view field 202 in the front to the right by x degrees is widened, and then displays the generated virtual space image on the HMD 200. Similarly, when the user is directed from the front to the left by y degrees, the virtual-space image display unit 13 generates a virtual space image in which the virtual space having a range (view field) that is changed from the view field 202 in the front to the left by y degrees is widened, and then displays the generated virtual space image on the HMD 200.

The movement-line display unit 14 generates and displays a plurality of movement lines of objects that respectively move to the plurality of hit areas, in the virtual space image displayed by the virtual-space image display unit 13. Note that, when the view field of the virtual space image displayed by the virtual-space image display unit 13 changes, the movement lines displayed on the virtual space image are also changed by the change of the view field.

The object display unit 15 displays the objects to move along the movement lines displayed by the movement-line display unit 14, in the virtual space image displayed by the virtual-space image display unit 13. In the embodiment, all of a plurality of objects are generated at the same start point (referred to as an object generation point below) set in the virtual space 201, and the objects move to the respective hit areas HA1 to HA6. The movement line displayed by the movement-line display unit 14 is a straight line or a curved line that connects the object generation point and the midpoint of each of the hit areas HA1 to HA6 to each other.

The object generation point is set at a fixed position on the back side of the virtual space 201. The fixed position means that, even though the view field of the virtual space image changes by the movement of the HMD 200, the position of the object generation point is not changed in the entire virtual space 201 and is always fixed at the same position in the virtual space 201. Meanwhile, the hit areas HA1 to HA6 are set on the front side of the virtual space 201. As described above, the setting positions of the hit areas HA1 to HA6 are also fixed in the virtual space 201.

The virtual player display unit 16 displays a character image of the virtual player at a predetermined position in the virtual space image displayed by the virtual-space image display unit 13. For example, the virtual player display unit 16 displays the virtual player at a fixed position in the lower center of the virtual space image. The fixed position in this case means that, even though the view field of the virtual space image changes by the movement of the HMD 200, the display position of the virtual player is not changed at the position in the lower center of the virtual space image, and is always fixed at the same position on the display screen of the HMD 200.

The virtual player display unit 16 performs display so that the virtual player operates in conjunction with the movement of the body of the user, in response to the operation on the controller 300, which is received by the operation receiving unit 11. That is, when the user who grips the controller 300 for the right hand moves the right hand, the movement of the right hand is received as the operation on the controller 300, by the operation receiving unit 11. In response to the movement of the right hand, the virtual player display unit 16 performs display so that the right hand of the virtual player moves to coincide with the movement of the right hand of the user. In addition, when the user who grips the controller 300 for the left hand moves the left hand, the movement of the left hand is received as the operation on the controller 300, by the operation receiving unit 11. In response to the movement of the left hand, the virtual player display unit 16 performs display so that the left hand of the virtual player moves to coincide with the movement of the left hand of the user.

Figure 3:
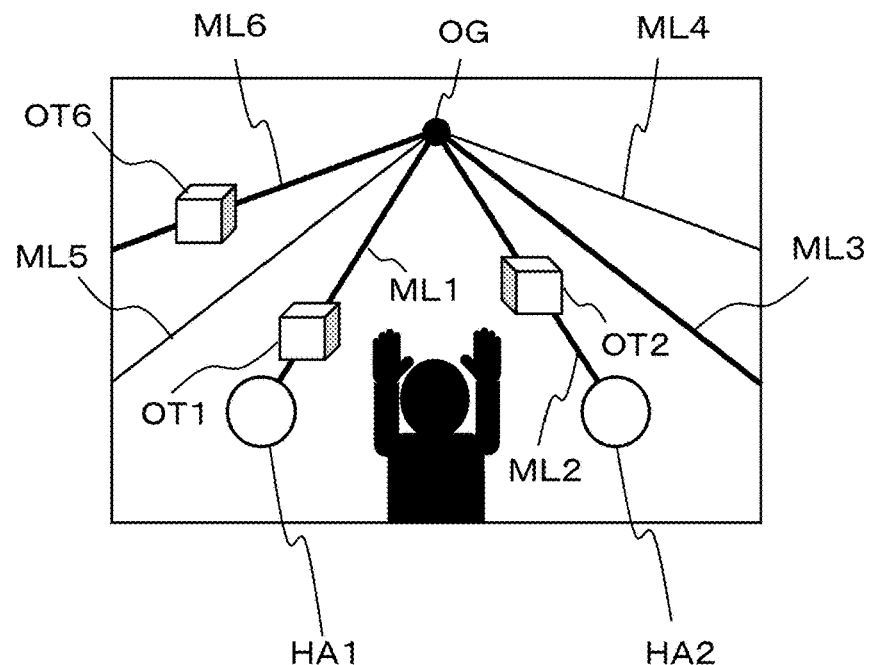
FIG. 3 is a diagram illustrating an example of an image displayed on the HMD when a user faces the front.
Figure 4:
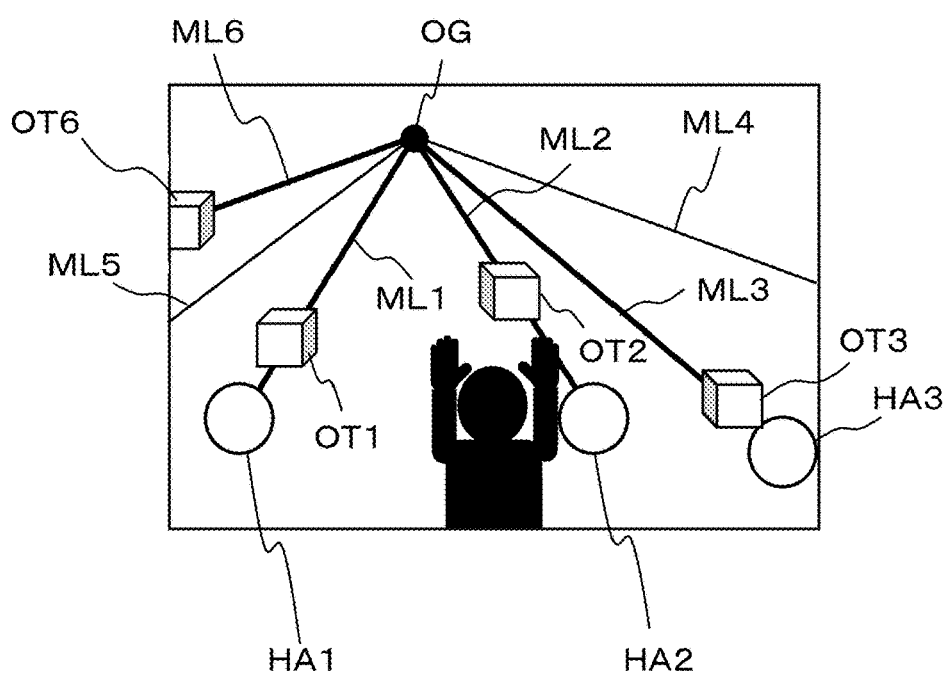
FIG. 4 is a diagram illustrating an example of an image displayed on the HMD when the user is directed from the front to the right by x degrees.
Figure 5:
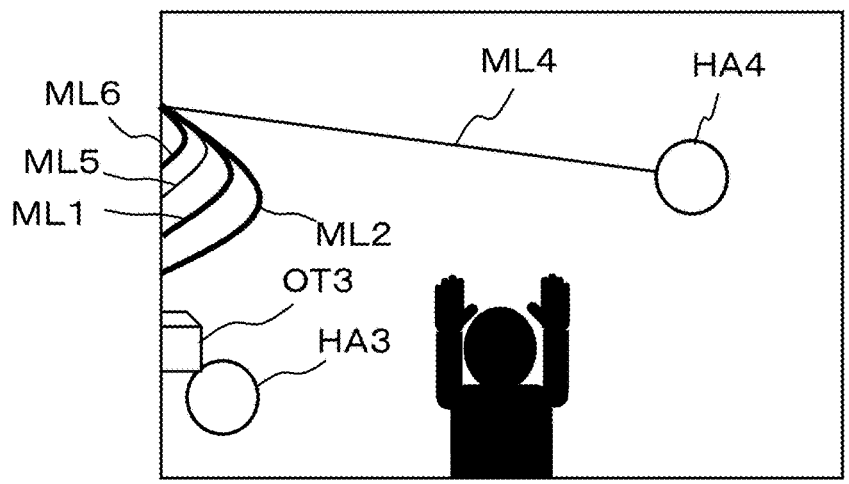
FIG. 5 is a diagram illustrating an example of an image displayed on the HMD when the user changes the view field up to a right edge of the virtual space.

FIGS. 3 to 5 are diagrams illustrating examples of an image displayed on the HMD 200 by the virtual-space image display unit 13, the movement-line display unit 14, and the object display unit 15. Among the drawings, FIG. 3 illustrates an example of an image displayed on the HMD 200 when the user faces the front (that is, when the view field 202 is set in the center of the virtual space 201 as in FIG. 2).

As illustrated in FIG. 3, when the view field 202 is set in the center of the virtual space 201 as in FIG. 2, the two hit areas HA1 and HA2 are set in the virtual space of the view field 202 corresponding to the virtual space image. The remaining four hit areas HA3 to HA6 are set outside the virtual space of the view field 202 corresponding to the virtual space image displayed on the HMD 200 as in FIG. 3. The virtual-space image display unit 13 may display the two hit areas HA1 and HA2 in the virtual space image to be or not to be superimposed on the virtual space image. FIG. 3 illustrates a state where the hit areas HA1 and HA2 are displayed as circular areas.

As illustrated in FIG. 3, in the embodiment, the object generation point OG is set at one point on the back side in the center in a left-right direction of the virtual space 201. The movement-line display unit 14 displays movement lines ML1 to ML6 connecting between the object generation point OG and the midpoints of the respective hit areas HA1 to HA6. Note that, regarding the four hit areas HA3 to HA6 that are not displayed on the virtual space image, the movement lines ML3 to ML6 are displayed in a manner that virtual positions of hit areas HA3 to HA6 on the outside of the virtual space image are obtained based on the positions in the virtual space 201, and the virtual positions are connected to the object generation point OG. The above description is similarly applied when a movement line for a hit area which is not displayed on the virtual space image is displayed in FIGS. 4 and 5 which will be described later.

At this time, preferably, the movement-line display unit 14 displays the movement lines ML1 and ML2, and the movement lines ML3 to ML6 to be distinguishable. The movement lines ML1 and ML2 are for the hit areas HA1 and HA2 set in the virtual space having the view field corresponding to the virtual space image displayed by the virtual-space image display unit 13. The movement lines ML3 to ML6 are for the hit areas HA3 to HA6 set outside the virtual space having the view field corresponding to the virtual space image displayed by the virtual-space image display unit 13.

In the embodiment, the movement-line display unit 14 generates and displays the movement lines ML1 and ML2 toward the hit areas HA1 and HA2 regarding the hit areas HA1 and HA2 set in the virtual space having the view field corresponding to the virtual space image displayed by the virtual-space image display unit 13. On the other hand, the movement-line display unit 14 generates and displays the movement lines ML3 to ML6 toward the outside of the virtual space image regarding the hit areas HA3 to HA6 set outside the virtual space having the view field corresponding to the virtual space image displayed by the virtual-space image display unit 13. Thus, the movement lines ML1 and ML2 for the hit areas HA1 and HA2 in the virtual space image being displayed on the HMD 200 and the movement lines ML3 to ML6 for the hit areas HA3 to HA6 outside the virtual space image being displayed are displayed to be distinguishable.

By configuring in this manner, even though the view field is not moved keeping the currently-displayed virtual space image as it is, the user can intuitively determine whether the movement line is a movement line with which the object reaches the hit area on the current virtual space image or a movement line with which the object does not reach the hit area on the current virtual space image. That is, the user can intuitively determine whether or not it is not necessary to move the view field with the currently-displayed virtual space image as it is, or it is necessary to move the HMD 200 to move the view field of the virtual space image, in order to cause the object to reach the hit area on the virtual space image displayed on the HMD 200.

Note that, the form in which the movement lines ML1 and ML2 for the hit areas HA1 and HA2 in the virtual space image being displayed and the movement lines ML3 to ML6 for the hit areas HA3 to HA6 outside the virtual space image being displayed are displayed to be distinguishable is not limited to the example illustrated in FIG. 3. For example, the movement lines ML1 and ML2 and the movement lines ML3 to ML6 may be displayed by changing the type of line or the color of the line, or only the movement lines ML3 to ML6 for the hit areas HA3 to HA6 outside the virtual space image may be displayed by blinking.

In particular, when the hit areas HA1 to HA6 are not displayed to be superimposed on the virtual space image, all the movement lines ML1 to ML6 are movement lines toward the outside of the virtual space image. Thus, an effective distinguishing method is a method of changing the type of line, the color of the line, or other display patterns. Note that, even when the hit areas HA1 and HA2 in the virtual space image being displayed are not displayed to be superimposed on the virtual space image, both the movement lines ML1 and ML2 and the movement lines ML3 to ML6 may be displayed to be recognizable in a manner as follows. That is, that the movement lines ML1 and ML2 for the hit areas HA1 and HA2 are displayed up to positions at which the hit areas HA1 and HA2 which are not displayed are existed. On the contrary, the movement lines ML3 to ML6 for the hit areas HA3 to HA6 outside the virtual space image being displayed are displayed up to the edge of the virtual space image.

The object display unit 15 displays the objects to move along the movement lines ML1 to ML6 displayed as in FIG. 3. In the example in FIG. 3, three objects OT1, OT2, and OT6 that are moving along the three movement lines ML1, ML2, and ML6 are displayed. A timing at which the object display unit 15 generates an object from the object generation point OG and the movement line along which the object moves among the movement lines ML1 to ML6 are determined in accordance with predetermined rules. Details of the rules are freely set. In addition, the speeds of the objects OT1, OT2, and OT6 moving may be equal to each other or may be different for each object.

Among the three objects OT1, OT2, and OT6, the two objects OT1 and OT2 that move along the movement lines ML1 and ML2 reach the two hit areas HA1 and HA2 soon. Since the hit areas HA1 and HA2 are displayed on the virtual space image, the user can visually recognize that the objects OT1 and OT2 reach the hit areas HA1 and HA2. Meanwhile, the object OT6 that moves along the movement line ML6 reaches the hit area HA6 soon. However, the hit area HA6 is not displayed on the current virtual space image. Thus, in a state where the current virtual space image is maintained to be displayed (without changing the view field), it is not possible for the user to visually recognize that the object OT6 reaches the hit area HA6.

Note that, regarding any of the objects OT1, OT2, and OT6, the display is deleted from the virtual space image after the object moves up to the edge of the virtual space image. However, when the user operates the controller 300 to perform a predetermined action at a timing at which the objects OT1 and OT2 reach the hit areas HA1 and HA2, an animation display in which the objects OT1 and OT2 are deleted may be performed. Even in this case, when the user does not operate the controller 300 at the timing at which the objects OT1 and OT2 reach the hit areas HA1 and HA2, and thus the objects OT1 and OT2 pass through the hit areas HA1 and HA2, the objects OT1 and OT2 are deleted from the virtual space image after the objects OT1 and OT2 move up to the edge of the virtual space image.

FIG. 4 illustrates an example of an image displayed on the HMD 200 when the user is directed from the front to the right by x degrees at the same timing as the timing in FIG. 3. As illustrated in FIG. 4, when the view field of the virtual space image is set, the three hit areas HA1 to HA3 are set in the virtual space having the view field corresponding to the virtual space image. The remaining three hit areas HA4 to HA6 are set outside the virtual space having the view field corresponding to the virtual space image displayed on the HMD 200 as in FIG. 4.

In the virtual space image illustrated in FIG. 4, the object generation point OG is present at a position that is slightly changed to the left of the center in the left-right direction. The reason is that the object generation point OG is fixed to the position in the center in the left-right direction in the entire virtual space 201, but the view field is changed to the right of the center in the left-right direction. In this case, the movement-line display unit 14 displays the movement lines ML1 to ML6 connecting between the object generation point OG at the position which is slightly changed to the left on the virtual space image and the midpoints (virtual positions for the hit areas HA4 to HA6 which are not displayed) of the respective hit areas HA1 to HA6.

In the virtual space image illustrated in FIG. 4, the third movement line ML3 in addition to the two movement lines ML1 and ML2 illustrated in FIG. 3 is displayed as a movement line from the object generation point OG to the hit area HA3. This is because the third hit area HA3 enters into the virtual space image by changing the view field of the virtual space image illustrated in FIG. 3 to the right as in FIG. 4.

In addition, in the virtual space image illustrated in FIG. 4, the object OT3 that moves along the third movement line ML3 is also displayed. That is, the object OT3 had been deleted by moving from the right edge to the outside in the virtual space image illustrated in FIG. 3, and then, is displayed again in the changed view field of the virtual space image as illustrated in FIG. 4 since the object OT3 enters again into the range of the view field corresponding to the changed virtual space image.

That is, the object display unit 15 displays the object OT3 to move to the outside of the virtual space image along the movement line ML3, during a period in which the object OT3 is present in the virtual space image displayed as in FIG. 3. Then, when the object OT3 moves up to the outside of the virtual space having the view field corresponding to the virtual space image being displayed, the object display unit 15 deletes the display of the object OT3. FIG. 3 illustrates the state where the display of the object OT3 is deleted.

However, even in the state where the display of the object OT3 is deleted, the object display unit 15 continues calculation relating to the movement of the object OT3 in the background until the object OT3 reaches the hit area HA3. Then, when the object OT3 becomes present in the virtual space having the view field that changes in response to the movement of the HMD 200, which is detected by the movement detection unit 12, the object display unit 15 displays the object OT3 to move along the movement line ML3 in the virtual space image corresponding to the virtual space having the changed view field.

As understood from the above description, even though the object is not displayed in the virtual space image as in FIG. 3, the object OT3 that does not reach the hit area HA3 yet may be present. Thus, such an object OT3 is displayed again on the virtual space image together with the hit area HA3 by changing the view field, and thus the user can perform a predetermined action at a timing at which the object OT3 reaches the hit area HA3.

In order to cause the user to know that such an object OT3 is present, the movement-line display unit 14 may display the movement line on which the object is moving and the movement line on which the object is not moving, to be distinguishable. In FIGS. 3 to 5, the movement line on which the object is moving is displayed with a line thicker than a line for the other movement line. Thus, the user can intuitively grasp that the object that is moving to the hit area is present on the outside of the virtual space image, and can move the view field to display the object and the corresponding hit area in the virtual space image. Note that, here, an example of distinguishing the movement line with the thickness of the line is described, but the movement line may be distinguished by the type of line or the color of the line.

FIG. 5 illustrates an example of an image displayed on the HMD 200 when the user changes the view field up to the right edge of the virtual space 201 at the same timing as the timing in FIG. 3. As illustrated in FIG. 5, when the view field of the virtual space image is set, the two hit areas HA3 and HA4 are set in the virtual space having the view field corresponding to the virtual space image. The remaining four hit areas HA1, HA2, HA5, and HA6 are set outside the virtual space having the view field corresponding to the virtual space image displayed as in FIG. 5.

In the state illustrated in FIG. 5, the object generation point OG is not in the virtual space image being displayed.

That is, the object generation point OG is at a position on the left side of the left edge of the virtual space image. In this case, the movement-line display unit 14 displays the movement lines ML1 to ML6 connecting between the virtual position of the object generation point OG on the left side of the left edge of the virtual space image and the midpoints (virtual positions for the hit areas HA1, HA2, HA5, and HA6 which are not displayed) of the respective hit areas HA1 to HA6.

Note that, regarding the four movement lines ML1, ML2, ML5, and ML6, neither the object generation point OG as the start point nor the hit areas HA1, HA2, HA5, and HA6 as end points are displayed on the virtual space image (all are on the outside of the virtual space image). Therefore, it is not possible to linearly draw the movement lines ML1, ML2, ML5, and ML6 as with the movement lines ML3 and ML4 indicating that the hit areas HA3 and HA4 are on the virtual space image. Therefore, as illustrated in FIG. 5, the movement lines ML1, ML2, ML5, and ML6 are displayed by curved lines. Regarding the movement lines ML1, ML2, and ML6 indicating that the objects OT1, OT2, and OT6 that are moving to the hit areas HA1, HA2, and HA6 are present among the movement lines ML1, ML2, ML5, and ML6, the movement lines ML1, ML2, and ML6 are displayed with thick lines, and thus the user is caused to know that it is necessary to perform the measures by changing the view field to the left.

The operation evaluation unit 17 evaluates operations based on whether or not the operations on the objects OT1 to OT6 are received by the operation receiving unit 11 at timings at which the objects OT1 to OT6 reach the hit areas set in the virtual space having the view field corresponding to the virtual space image displayed by the virtual-space image display unit 13, in response to the movement of the HMD 200, which is detected by the movement detection unit 12 (two hit areas HA1 and HA2 in the case of FIG. 3, three hit areas HA1 to HA3 in the case of FIG. 4, and two hit areas HA3 and HA4 in the case of FIG. 5).

For example, when the operation receiving unit 11 receives, from the controller 300, an operation of instructing the virtual player to touch the objects OT1 to OT6 at timings at which the objects OT1 to OT6 reach the hit areas HA1 to HA6, such an operation is evaluated as "success", and the score is added. On the other hand, when a timing at which the operation receiving unit 11 receives the operation from the controller 300 does not coincide with the timings at which the objects OT1 to OT6 reach the hit areas HA1 to HA6, such an operation is evaluated as "failure", and the score is not added.

Note that, here, a touch operation is described as an example of actions on the objects OT1 to OT6, but the embodiment is not limited to the touch operation. That is, any operation may be performed so long as the operation is an operation of performing an action on the positions of the hit areas HA1 to HA6 at the timings at which the objects OT1 to OT6 reach the hit areas HA1 to HA6.

Figure 6:
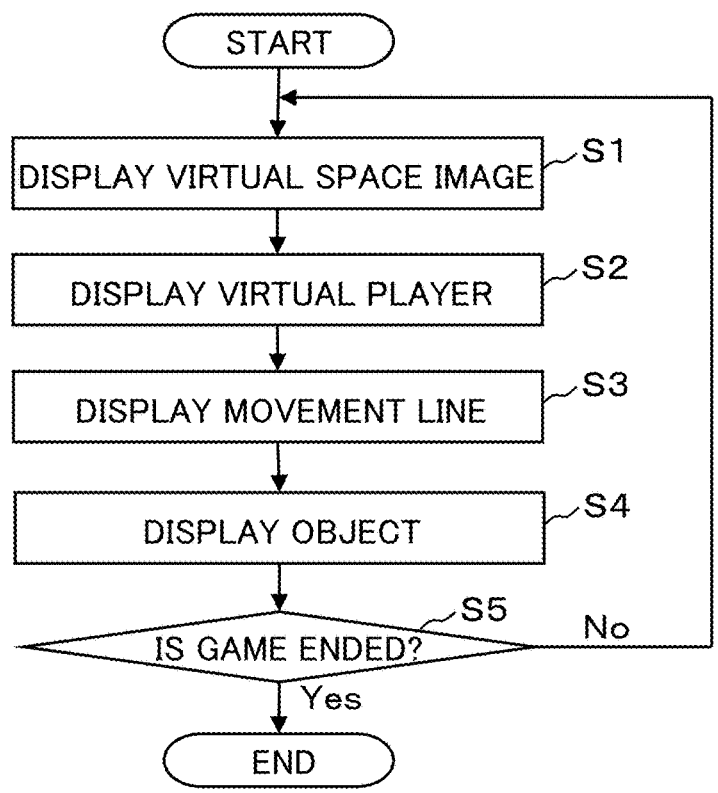
FIG. 6 is a flowchart illustrating overall processing executed when the user instructs a start of a game.

FIGS. 6 to 9 are flowcharts illustrating examples of an operation of the timing game device 100 configured as described above, according to the embodiment. FIG. 6 is a flowchart illustrating an example of overall processing executed when the user instructs a start of a game. That is, when the game is started, the virtual-space image display unit 13 generates a virtual space image having a view field that changes in response to the movement of the HMD 200, which is detected by the movement detection unit 12, and displays the virtual space image on the HMD 200, based on VR image data stored in the VR image storage unit 20 (Step S1).

In addition, the virtual player display unit 16 displays a character image of the virtual player at a predetermined position in the virtual space image displayed by the virtual-space image display unit 13 (Step S2). Here, the virtual player display unit 16 performs display so that the virtual player operates in conjunction with the movement of the body of the user, in response to the operation on the controller 300, which is received by the operation receiving unit 11.

Then, the movement-line display unit 14 generates and displays a plurality of movement lines of objects that respectively move to the plurality of hit areas, in the virtual space image displayed by the virtual-space image display unit 13 (Step S3). Then, the object display unit 15 displays the objects to move along the movement lines displayed by the movement-line display unit 14, in the virtual space image displayed by the virtual-space image display unit 13 (Step S4). As will be described later, in the process in Step S4, an operation on the object by the user is evaluated.

After the process of Step S4, the timing game device 100 determines whether or not to end the game (Step S5). Note that, conditions for when the game is ended are determined by rules in advance. When the conditions for ending the game are not satisfied, the process returns to Step S1. On the other hand, when the conditions for ending the game are satisfied, the processing of the flowchart illustrated in FIG. 6 is ended.

Figure 7:
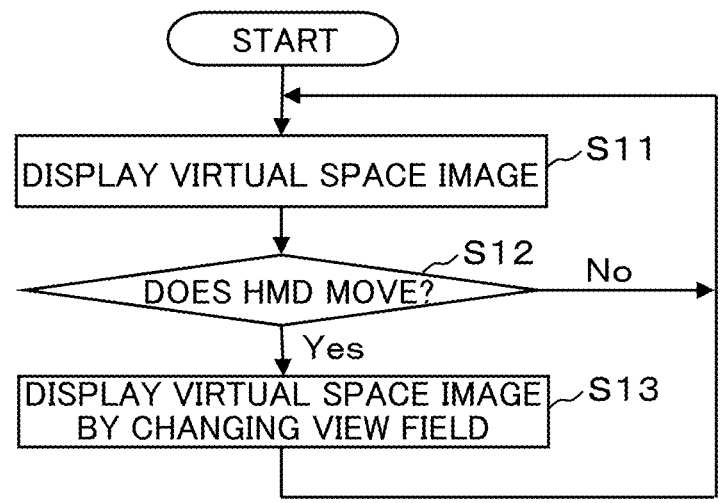
FIG. 7 is a flowchart illustrating an example of processing of a virtual-space image display unit according to the embodiment.

FIG. 7 is a flowchart illustrating an example of the process of the virtual-space image display unit 13 in Step S1. That is, when the game is started, the virtual-space image display unit 13 generates the virtual space image having a predetermined view field which is determined in advance (for example, view field 202 set in the center of the virtual space 201 in the left-right direction as illustrated in FIG. 2) based on VR image data stored in the VR image storage unit 20, and displays the generated virtual space image on the HMD 200 (Step S11).

Then, the virtual-space image display unit 13 determines whether or not the movement detection unit 12 detects the movement of the HMD 200, based on the information output from the sensor of the HMD 200 (Step S12). When the movement of the HMD 200 is not detected, the process returns to Step S11, and the virtual space image having the current view field is continuously displayed. On the other hand, when the movement of the HMD 200 is detected, the virtual-space image display unit 13 generates a virtual space image having the view field that is changed in accordance with the detected movement direction and the amount of movement of the HMD 200, and displays the generated virtual space image on the HMD 200 (Step S13). Then, the process returns to Step S11.

Figure 8:
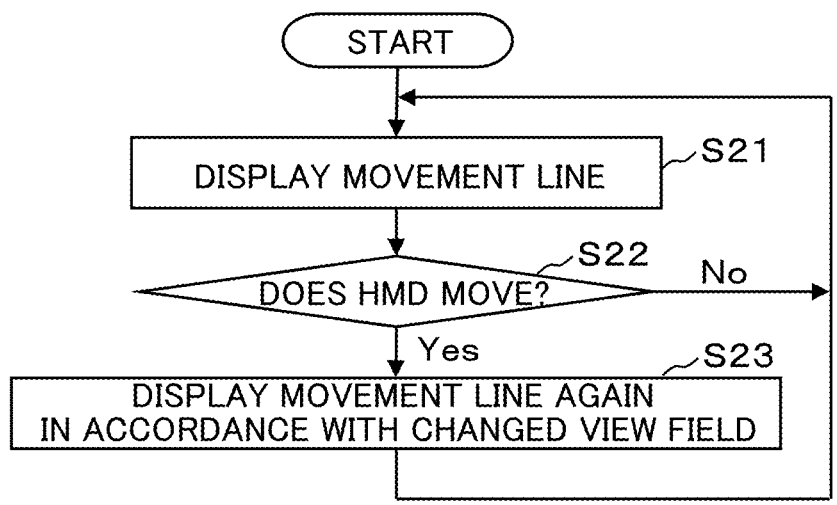
FIG. 8 is a flowchart illustrating an example of processing of a movement-line display unit according to the embodiment.

FIG. 8 is a flowchart illustrating an example of the process of the movement-line display unit 14 in Step S3. That is, when the game is started, the movement-line display unit 14 generates and displays a plurality of movement lines of objects that respectively move to a plurality of hit areas from the object generation point OG set in the virtual space 201, in the virtual space image displayed by the virtual-space image display unit 13 so as to have a predetermined view field which is determined in advance (Step S21).

Then, the movement-line display unit 14 determines whether or not the movement detection unit 12 detects the movement of the HMD 200, based on the information output from the sensor of the HMD 200 (Step S22). When the movement of the HMD 200 is not detected, the process returns to Step S21, and the current movement line is continuously displayed. On the other hand, when the movement of the HMD 200 is detected, the movement-line display unit 14 generates and displays again the movement lines of the objects that respectively move to the plurality of hit areas from the object generation point OG, in the virtual space image generated by the virtual-space image display unit 13 after the view field is changed (Step S23). Then, the process returns to Step S22.

Figure 9:
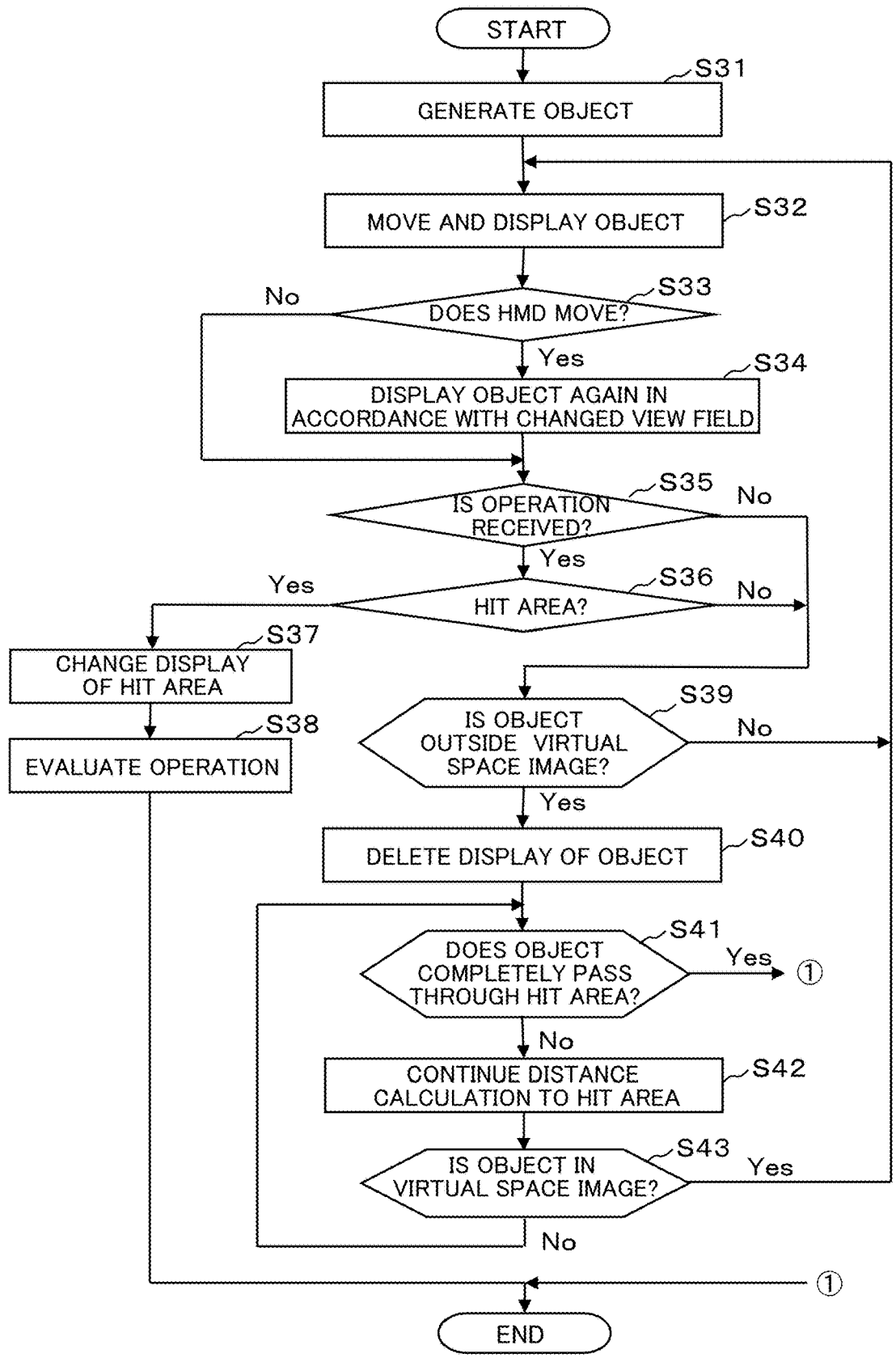
FIG. 9 is a flowchart illustrating an example of processing of an object display unit and an operation evaluation unit according to the embodiment.

FIG. 9 is a flowchart illustrating an example (a portion including processing of the operation evaluation unit 17) of processing of the object display unit 15 in Step S4. Note that, the flowchart illustrated in FIG. 9 illustrates processing from when the object display unit 15 generates one object until the object display unit 15 deletes the display of the object. The processing illustrated in FIG. 9 is executed for each generated object.

Firstly, the object display unit 15 generates an object from the object generation point OG set in the virtual space 201 (Step S31). Then, the object display unit 15 displays the generated object to move along a movement line at a predetermined speed in the virtual space image (Step S32). At this time, the object display unit 15 determines a movement line along with the object is moved among a plurality of movement lines, in accordance with a predetermined rule.

Then, the object display unit 15 determines whether or not the movement detection unit 12 detects the movement of the HMD 200, based on the information output from the sensor of the HMD 200 (Step S33). When the movement of the HMD 200 is not detected, the process proceeds to Step S35. On the other hand, when the movement of the HMD 200 is detected, the object display unit 15 displays the object to move along the movement line which is displayed again, in the virtual space image that is generated by the virtual-space image display unit 13 changing the view field (Step S34).

Then, the operation receiving unit 11 determines whether or not an operation on the controller 300 by the user is received (Step S35). When the operation receiving unit 11 receives the operation, the operation receiving unit 11 determines whether or not the received operation is an operation on the object, which is performed at a timing at which the object reaches the hit area (Step S36).

Here, when the received operation is the operation on the object, which is performed at the timing at which the object reaches the hit area, the object display unit 15 changes the display of the object, and thus causes the user to know that the operation is performed at an appropriate timing (Step S37). For example, the display of the object is deleted in a state where the display of the object is changed. Then, the operation evaluation unit 17 evaluates the operation received by the operation receiving unit 11, as "success", and adds the score (Step S38). Thus, the processing of the flowchart illustrated in FIG. 9 is ended.

When the operation receiving unit 11 does not receive the operation in Step S35 and when the received operation is not the operation on the object, which is performed at the timing at which the object reaches the hit area in Step S36, the object display unit 15 determines whether or not the object moves up to the outside of the virtual space image (Step S39). When the object is still in the range of the virtual space image, the process returns to Step S32, and the object continuously moves.

On the other hand, when it is determined that the object moves up to the outside of the range of the virtual space image, the object display unit 15 deletes the display of the object (Step S40). Then, the object display unit 15 determines whether or not the object of which the display has been deleted completely passes through the hit area (Step S41). Here, the object display unit determines whether or not to be a case where the operation by the user is not performed at the timing at which the object reaches the hit area in the virtual space corresponding to the virtual space image being displayed, and the object moves up to outside the range of the virtual space image after passing through the hit area. In such a case, the processing of the flowchart illustrated in FIG. 9 is ended.

On the other hand, when it is determined in Step S41 that the object of which the display has been deleted does not pass through the hit area completely, this means that the object is moving yet to the hit area which is outside the virtual space corresponding to the virtual space image being displayed. Thus, in this case, the object display unit 15 continues the calculation relating to the movement of the object in the background (Step S42). Then, it is determined whether or not the object enters into the range of the virtual space image again (Step S43). A case where the object enters into the range of the virtual space image again is a case where the object is in the virtual space image which is displayed again so that the view field is changed in response to the movement of the HMD 200.

Here, when the object which is moving in the background does not enters into the range of the virtual space image, the process returns to Step S41. Here, when the object which is moving in the background passes, the processing of the flowchart illustrated in FIG. 9 is ended. However, during a period in which the object does not pass yet, the calculation relating to the movement of the object is continuously performed in the background (Step S41). On the other hand, when it is determined that the object that is moving in the background enters into the range of the virtual space image again, the process returns to Step S32. In this case, the object is displayed again in the virtual space image, and the display in which the object moves to the hit area is started again.

As described in detail above, in the embodiment, the virtual space image having the view field that changes in response to the movement of the HMD 200 is generated, based on the virtual-reality image data in which the plurality of hit areas are set at different positions in the virtual space 201 having a range wider than the view field (view field corresponding to the size of the display screen) corresponding to a case where the HMD 200 is not moved, and display the generated virtual space image on the HMD 200, and a plurality of movement lines of objects that respectively move to a plurality of hit areas are generated and displayed in the virtual space image. Then, an operation is evaluated based on whether or not an operation on the object is received at a timing at which the object displayed to move along the movement line reaches the hit area.

According to the embodiment configured as described above, in some of the hit areas set in the entire virtual space 201, in a case where the view field of the displayed virtual space image is not changed by the movement of the HMD 200, it is not possible for the user to perform an action. Therefore, the user progresses a game by performing an operation on the object at a timing at which the object reaches the hit area set in the virtual space of the changed view field while moving the HMD 200 to appropriately change the view field of the virtual space image. Accordingly, it is possible to utilize the characteristics of VR that the view field of a virtual space image displayed on the HMD 200 may be changed, diversify an action on an object that moves in a virtual space. It is possible to cause a user to enjoy a game more.

Note that, in the embodiment, an example in which the movement line for the hit area in the virtual space image being displayed and the movement line for the hit area outside the virtual space image being displayed are displayed to be recognizable is described. Instead of or in addition to the example, the display form of the movement line may be changed in accordance with the distance between the hit area and the object that is moving along the movement line.

For example, a form as follows may be considered. That is, a position having a predetermined distance from the hit area is set as a boundary. When the object is moving from the object generation point OG to the boundary, the movement line is displayed with the blue color. When the object is moving from the boundary to the hit area, the movement line is displayed with the red color. In this case, preferably, the movement-line display unit 14 continuously displays the movement line directed to the outside of the virtual space image being displayed, even during a period in which the display of the object is deleted by the object moving to the outside of the virtual space of the view field corresponding to the virtual space image, and changes a display form of the movement line in accordance with the distance between the hit area and the object having the movement which is continuously calculated after the display of the object is deleted.

With this configuration, regardless of that the hit area is or is not in the virtual space corresponding to the virtual space image being displayed, it is possible to cause the user to intuitively grasp that the object is approaching the hit area. Then, the user who grasps that the object is approaching the hit area which is outside the virtual space image can immediately change the view field to perform an operation on the object at a timing at which the object reaches the hit area. Note that, the display form of the movement line, which changes in accordance with the distance between the hit area and the object that is moving is not limited to the color of the line as described above. For example, the user may be caused to know that the object is approaching the hit area, by changing the type of line or blinking display.

Figure 10:
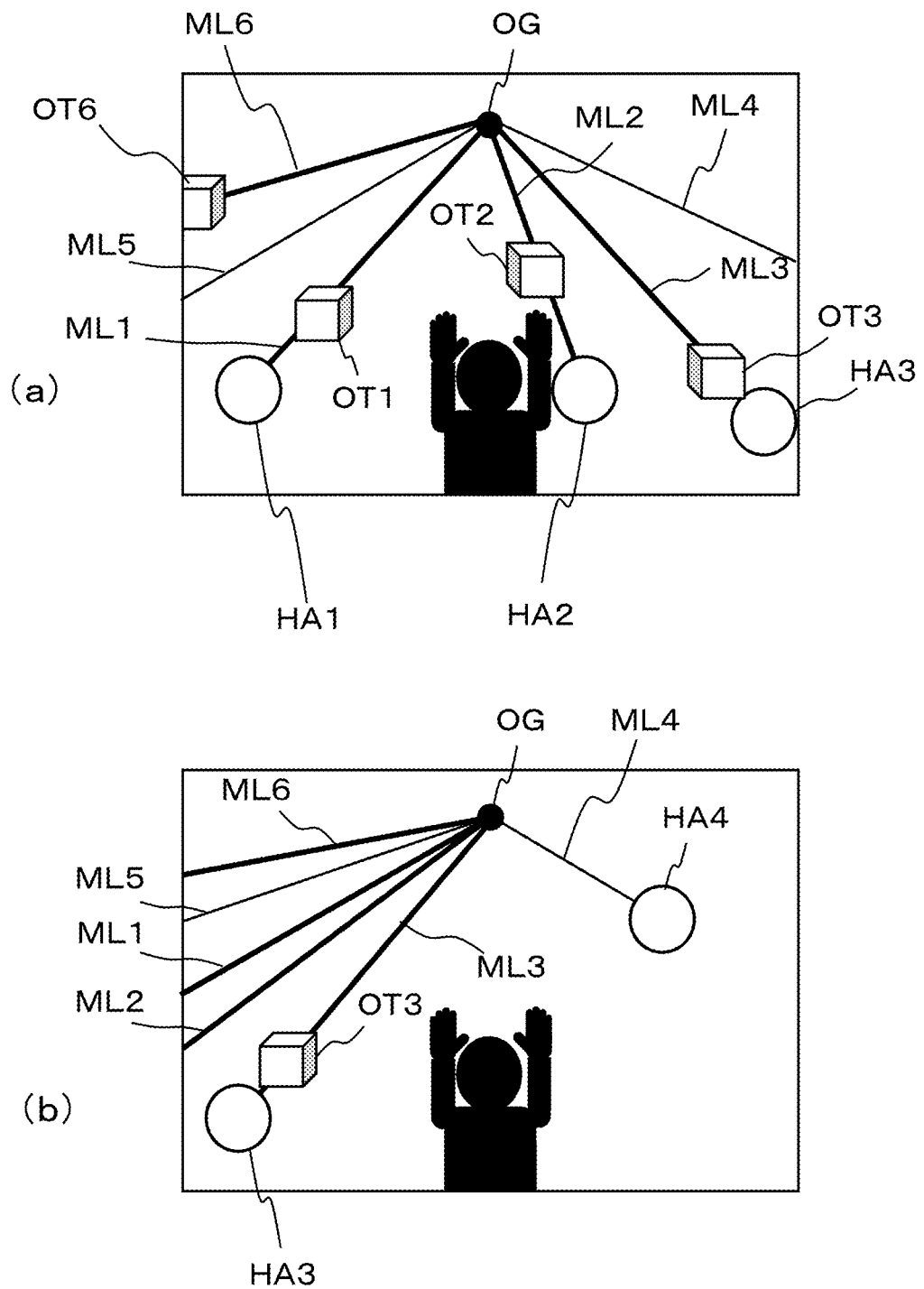
FIG. 10 is a diagram illustrating another example of the image displayed on the HMD.

Further, in the embodiment, an example in which the position of the object generation point OG is fixed to one point in the virtual space 201 is described. The invention is not limited to this example. For example, the object generation point may be fixed to a predetermined position (for example, position on the back side of the virtual space image at the center in the left-right direction) in the virtual space image that changes in response to the change of the view field. FIG. 10 is a diagram illustrating an example of an image displayed when the object generation point OG is fixed to a predetermined position in the virtual space image. FIG. 10(a) corresponds to FIG. 4, and FIG. 10(b) corresponds to FIG. 5.

That is, when the object generation point OG is fixed to the predetermined position in the virtual space image, in the same scene as FIG. 4, the movement lines ML1 to ML6, the hit areas HA1 to HA3, and the objects OT1 to OT3 are displayed as in FIG. 10(a). In addition, in the same scene as FIG. 5, the movement lines ML1 to ML6, the hit areas HA3 and HA4, and the object OT3 are displayed as in FIG. 10(b).

Further, in the embodiment, an example in which the object generation point OG being the start point of the plurality of movement lines ML1 to ML6 is set to a common one point is described. The invention is not limited to this example. For example, the object generation point OG different for each of the movement lines ML1 to ML6 may be provided.

In addition, in the embodiment, an example in which the hit areas HA1 to HA6 are also set at the fixed positions in the virtual space 201 is described, but the invention is not limited to this example. For example, the positions of the hit areas HA1 to HA6 may be moved in the virtual space 201 with the progress of the game. In this case, the hit area is set to be at any position at a time point at which the object is generated at the object generation point OG, and then the position of the hit area is fixed until the object is deleted. Alternatively, when the object is moving to the hit area, the installation position of the hit area may be moved.

Further, in the embodiment, an example in which an operation is evaluated only from a viewpoint of whether or not the operation on the object is performed at a timing at which the object reaches the hit area is described. The invention is not limited to this example. That is, an operation may be evaluated from a viewpoint of whether or not an operation of the type designated in accordance with the object is performed, in addition to the viewpoint of whether or not the operation on the object is performed at a timing at which the object reaches the hit area. In this case, it is possible to cause the user to grasp the type of operation to be performed on the object, for example, by changing the display form of the object.

In addition, in the embodiment, an example in which the movement line toward the hit area (movement line having the position of the hit area as the end) is generated and displayed regarding the hit area set in the virtual space having the view field corresponding to the virtual space image being displayed, and the movement line toward the outside of the virtual space image (movement line having the edge of the virtual space image as the end) is generated and displayed regarding the hit area set outside the virtual space having the view field corresponding to the virtual space image being displayed is described. For all movement lines, the movement lines toward the outside of the virtual space image may be generated and displayed.

In addition, the embodiment is merely an example for embodying the invention, and the technical scope of the invention should not be construed in a limited manner. That is, the invention can be practiced in various forms without departing from the gist or the main features.

REFERENCE SIGNS LIST

10 Control unit
11 Operation receiving unit
12 Movement detection unit
13 Virtual-space image display unit
14 Movement-line display unit
15 Object display unit
16 Virtual player display unit
17 Operation evaluation unit
20 VR image storage unit (virtual space image storage unit)
100 Timing game device
200 HMD
300 Controller

The invention claimed is:

1. A timing game device, comprising:
an operation receiving unit that receives an operation to a controller by a user;
a movement detection unit that detects a movement of a head mounted display that the user wears;
a virtual-space image display unit that generates a virtual space image having a view field that changes in response to the movement of the head mounted display, which is detected by the movement detection unit, based on virtual-reality image data in which a plurality of hit areas are set at different positions in a virtual space having a range wider than a fixed view field corresponding to a case where the head mounted display is not moved, and displays the generated virtual space image on the head mounted display;
a movement-line display unit that generates and displays a plurality of movement lines including a first movement line showing a trajectory of a first object toward the hit area set inside the virtual space that is inside of the view field corresponding to the virtual space image displayed by the virtual-space image display unit and a second movement line showing a trajectory of a second object toward the hit area set outside the virtual space that is outside of the view field corresponding to the virtual space image displayed by the virtual-space image display unit, in the virtual space image displayed by the virtual-space image display unit;
an object display unit that displays the first object and the second object to move along the movement lines displayed by the movement-line display unit, in the virtual space image displayed by the virtual-space image display unit; and
an operation evaluation unit that evaluates an operation on the first object based on whether or not the operation on the first object is received by the operation receiving unit at a timing at which the first object reaches the hit area set inside the virtual space having the view field corresponding to the virtual space image which is displayed by the virtual-space image display unit in response to the movement of the head mounted display, which is detected by the movement detection unit;
wherein the movement-line display unit displays the first movement line and the second movement line to be distinguishable to each other by changing presence or absence of blinking between the first movement line and the second movement line.

2. The timing game device according to claim 1, characterized in that
the movement-line display unit displays an active movement line indicating that the first object and the second object is moving to the hit area and an inactive movement line indicating that the first object and the second object is not moving to the hit area, so as to be distinguishable to each other by changing a thickness of line, a type of line, or a color of line between the active movement line and the inactive movement line.

3. The timing game device according to claim 2, characterized in that
the movement-line display unit changes a display form of a type of line, a color of line, or blinking of the movement line in accordance with a distance between the hit area and the first object and the second object that is displayed by the object display unit so as to move along the movement line.

4. The timing game device according to claim 1, characterized in that
the movement-line display unit changes a display form of a type of line, a color of line, or blinking of the movement line in accordance with a distance between the hit area and the first object and the second object that is displayed by the object display unit so as to move along the movement line.

5. A timing game device, comprising:
an operation receiving unit that receives an operation to a controller by a user;

a movement detection unit that detects a movement of a head mounted display that the user wears;

a virtual-space image display unit that generates a virtual space image having a view field that changes in response to the movement of the head mounted display, which is detected by the movement detection unit, based on virtual-reality image data in which a plurality of hit areas are set at different positions in a virtual space having a range wider than a fixed view field corresponding to a case where the head mounted display is not moved, and displays the generated virtual space image on the head mounted display;

a movement-line display unit that generates and displays a plurality of movement lines including a first movement line showing a trajectory of a first object toward the hit area set inside the virtual space that is inside of the view field corresponding to the virtual space image displayed by the virtual-space image display unit and a second movement line showing a trajectory of a second object toward the hit area set outside the virtual space that is outside of the view field corresponding to the virtual space image displayed by the virtual-space image display unit, in the virtual space image displayed by the virtual-space image display unit;

an object display unit that displays the first object and the second object to move along the movement lines displayed by the movement-line display unit, in the virtual space image displayed by the virtual-space image display unit; and an operation evaluation unit that evaluates an operation on the first object based on whether or not the operation on the first object is received by the operation receiving unit at a timing at which the first object reaches the hit area set inside the virtual space having the view field corresponding to the virtual space image which is displayed by the virtual-space image display unit in response to the movement of the head mounted display, which is detected by the movement detection unit;

wherein the movement-line display unit changes a display form of a type of line, a color of line, or blinking of the movement line in accordance with a distance between the hit area and the first object and the second object that is displayed by the object display unit so as to move along the movement line.

6. The timing game device according to claim 5, characterized in that regarding the second object displayed to move along the second movement line toward the hit area set outside the virtual space, when the second object moves to the outside the virtual space, the object display unit continuously performs a calculation for a movement of the second object while deleting the display of the second object, and when, after the second object moves to the outside the virtual space, the second object becomes present inside the virtual space of a view field changed in response to the movement of the head mounted display, which is detected by the movement detection unit, the object display unit displays the second object to move along the second movement line in the virtual space image corresponding to the virtual space of the changed view field, and the movement-line display unit continuously displays the second movement line even during a period in which the display of the second object is deleted by the second object moving to the outside the virtual space, and changes a display form of a type of line, a color of line, or blinking of the second movement line in accordance with a distance between the hit area and the second object having the movement which is continuously calculated after the display of the second object is deleted.

7. A timing game device characterized by comprising:

an operation receiving unit that receives an operation to a controller by a user;

a movement detection unit that detects a movement of a head mounted display that the user wears;

a virtual-space image display unit that generates a virtual space image having a view field that changes in response to the movement of the head mounted display, which is detected by the movement detection unit, based on virtual-reality image data in which a plurality of hit areas are set at different positions in a virtual space having a range wider than a fixed view field corresponding to a case where the head mounted display is not moved, and displays the generated virtual space image on the head mounted display;

a movement-line display unit that generates and displays a plurality of movement lines including a first movement line showing a trajectory of a first object toward the hit area set inside the virtual space that is inside of the view field corresponding to the virtual space image displayed by the virtual-space image display unit and a second movement line showing a trajectory of a second object toward the hit area set outside the virtual space that is outside of the view field corresponding to the virtual space image displayed by the virtual-space image display unit, in the virtual space image displayed by the virtual-space image display unit;

an object display unit that displays the first object and the second object to move along the movement lines displayed by the movement-line display unit, in the virtual space image displayed by the virtual-space image display unit; and an operation evaluation unit that evaluates an operation on the first object based on whether or not the operation on the first object is received by the operation receiving unit at a timing at which the first object reaches the hit area set inside the virtual space having the view field corresponding to the virtual space image which is displayed by the virtual-space image display unit in response to the movement of the head mounted display, which is detected by the movement detection unit;

wherein the movement-line display unit displays an active movement line indicating that the first object and the second object is moving to the hit area and an inactive movement line indicating that the first object and the second object is not moving to the hit area, so as to be distinguishable to each other by changing a thickness of line, a type of line, or a color of line between the active movement line and the inactive movement line; and wherein the movement-line display unit changes a display form of a type of line, a color of line, or blinking of the movement line in accordance with a distance between the hit area and the first object and the second object that is displayed by the object display unit so as to move along the movement line.

8. A program for a timing game stored on a non-transitory computer readable medium, causing a computer to function as:

operation receiving means for receiving an operation to a controller by a user;

movement detection means for detecting a movement of a head mounted display that the user wears;

virtual-space image display means for generating a virtual space image having a view field that changes in response to movement of the head mounted display, which is detected by the movement detection means, based on virtual-reality image data in which a plurality of hit areas are set at different positions in a virtual space having a range wider than a fixed view field corresponding to a case where the head mounted display is not moved, and displaying the generated virtual space image on the head mounted display;

movement-line display means for generating and displaying a plurality of movement lines including a first movement line showing a trajectory of a first object toward the hit area set inside the virtual space that is inside of the view field corresponding to the virtual space image displayed by the virtual-space image display means and a second movement line showing a trajectory of a second object toward the hit area set outside the virtual space that is outside of the view field corresponding to the virtual space image displayed by the virtual-space image display means, in the virtual space image displayed by the virtual-space image display means;

object display means for displaying the first object and the second object to move along the movement lines displayed by the movement-line display means, in the virtual space image displayed by the virtual-space image display means; and operation evaluation means for evaluating an operation on the first object based on whether or not the operation on the first object is received by the operation receiving means at a timing at which the first object reaches the hit area set inside the virtual space having the view field corresponding to the virtual space image which is displayed by the virtual-space image display means in response to the movement of the head mounted display, which is detected by the movement detection means;

wherein the movement-line display means displays the first movement line and the second movement line to be distinguishable to each other by changing presence or absence of blinking between the first movement line and the second movement line.

9. A program for a timing game stored on a non-transitory computer readable medium, causing a computer to function as:

operation receiving means for receiving an operation to a controller by a user;

movement detection means for detecting a movement of a head mounted display that the user wears;

virtual-space image display means for generating a virtual space image having a view field that changes in response to movement of the head mounted display, which is detected by the movement detection means, based on virtual-reality image data in which a plurality of hit areas are set at different positions in a virtual space having a range wider than a fixed view field corresponding to a case where the head mounted display is not moved, and displaying the generated virtual space image on the head mounted display;

movement-line display means for generating and displaying a plurality of movement lines including a first movement line showing a trajectory of a first object toward the hit area set inside the virtual space that is inside of the view field corresponding to the virtual space image displayed by the virtual-space image display means and a second movement line showing a trajectory of a second object toward the hit area set outside the virtual space that is outside of the view field corresponding to the virtual space image displayed by the virtual-space image display means, in the virtual space image displayed by the virtual-space image display means;

object display means for displaying the first object and the second object to move along the movement lines displayed by the movement-line display means, in the virtual space image displayed by the virtual-space image display means; and operation evaluation means for evaluating an operation on the first object based on whether or not the operation on the first object is received by the operation receiving means at a timing at which the first object reaches the hit area set inside the virtual space having the view field corresponding to the virtual space image which is displayed by the virtual-space image display means in response to the movement of the head mounted display, which is detected by the movement detection means;

wherein the movement-line display means changes a display form of a type of line, a color of line, or blinking of the movement line in accordance with a distance between the hit area and the first object and the second object that is displayed by the object display means so as to move along the movement line.

* * * * *